(12) United States Patent
Klostermann

(10) Patent No.: US 12,128,755 B2
(45) Date of Patent: Oct. 29, 2024

(54) COOLANT SYSTEM FOR A VEHICLE AND A METHOD OF CONTROLLING A COOLANT SYSTEM

(71) Applicant: VOLVO TRUCK CORPORATION, Gothenburg (SE)

(72) Inventor: André Klostermann, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 326 days.

(21) Appl. No.: 17/808,602

(22) Filed: Jun. 24, 2022

(65) Prior Publication Data

US 2023/0001781 A1 Jan. 5, 2023

(30) Foreign Application Priority Data

Jul. 5, 2021 (EP) ...................................... 21183668

(51) Int. Cl.
*B60K 11/04* (2006.01)
*H02K 9/00* (2006.01)

(52) U.S. Cl.
CPC ................ *B60K 11/04* (2013.01); *H02K 9/00* (2013.01)

(58) Field of Classification Search
CPC .................................. H02K 9/00; B60K 11/04
See application file for complete search history.

(56) References Cited

U.S. PATENT DOCUMENTS

| | | | | |
|---|---|---|---|---|
| 2003/0127528 | A1* | 7/2003 | Sabhapathy | B60L 3/0023 237/12.3 B |
| 2009/0277401 | A1 | 11/2009 | Theorell | |
| 2010/0297513 | A1 | 11/2010 | Yasuda et al. | |
| 2016/0297293 | A1* | 10/2016 | Ito | B60K 1/04 |
| 2018/0274429 | A1 | 9/2018 | Quix et al. | |
| 2019/0135084 | A1* | 5/2019 | Sato | B60H 1/3227 |
| 2019/0271258 | A1* | 9/2019 | Mendez Abrego | F01P 7/164 |
| 2020/0158003 | A1* | 5/2020 | Quix | F01P 3/02 |
| 2020/0408134 | A1 | 12/2020 | Asano et al. | |
| 2022/0134905 | A1* | 5/2022 | Cox | B60L 3/0046 429/71 |
| 2022/0314737 | A1* | 10/2022 | Hwang | F01P 11/029 |
| 2022/0355645 | A1* | 11/2022 | Jeong | B60H 1/00278 |
| 2022/0403770 | A1* | 12/2022 | Kim | F01P 5/10 |
| 2023/0091591 | A1* | 3/2023 | Oetken | E02F 9/2091 429/120 |

(Continued)

FOREIGN PATENT DOCUMENTS

| | | |
|---|---|---|
| EP | 2426765 A1 | 3/2012 |
| JP | H0992310 A | 4/1997 |
| KR | 20160019700 A | 2/2016 |

OTHER PUBLICATIONS

Extended European Search Report in corresponding European Application No. 21183668.9 dated Dec. 22, 2021 (9 pages).

*Primary Examiner* — Erez Gurari
(74) *Attorney, Agent, or Firm* — Venable LLP; Jeffri A. Kaminski

(57) ABSTRACT

A coolant system includes a first and a second coolant tank, the first and second coolant tanks are connectable to each other by means of a coolant supply conduit and a first coolant feeding conduit, wherein the first coolant feeding conduit comprises a fluid pump. The coolant system hereby provides an active coolant pressure control with service filling ability.

13 Claims, 5 Drawing Sheets

(56) References Cited

U.S. PATENT DOCUMENTS

| | | | |
|---|---|---|---|
| 2023/0158860 A1* | 5/2023 | Kim | B60H 1/3205 |
| | | | 62/115 |
| 2023/0331077 A1* | 10/2023 | Liu | B60K 11/04 |
| 2024/0198763 A1* | 6/2024 | Ok | B60H 1/00571 |

* cited by examiner

COOLANT SYSTEM FOR A VEHICLE AND A METHOD OF CONTROLLING A COOLANT SYSTEM

TECHNICAL FIELD

The present invention relates to a coolant system for a vehicle. The present invention also relates to a method of controlling a coolant system. Although the invention will mainly be directed to a vehicle in the form of a truck using a fuel cell for generating electric power to an electric traction motor, the invention may also be applicable for other types of vehicles in which a coolant system can be implemented for e.g. cooling a vehicle battery, etc.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

Vehicles using a fuel cell system for generating electric power often struggles with obtaining sufficient coolant for the operating the fuel cell system at optimum levels, in particular for fuel cell systems arranged in heavy duty vehicles. Also, the fuel cell systems require an active pressure control to avoid different pressure levels on each side of a fuel cell membrane in the fuel cell system.

It is therefore a desire to further improve the coolant systems for vehicle using a fuel cell system for generating electric power.

SUMMARY

It is thus an object of the present invention to at least partially overcome the above described deficiencies.

According to a first aspect, there is provided a coolant system for a vehicle at least partly propelled by an electric traction motor, the coolant system being configured to supply coolant to a coolant circuit for an electric source arranged to supply electric power to the electric traction motor, wherein the coolant system comprises a first coolant tank configured to contain a coolant fluid, a coolant supply conduit connected to the first coolant tank, the coolant supply conduit being connectable to the coolant circuit for supply of coolant from the first coolant tank to the coolant circuit, a second coolant tank comprising a filling portion for admitting coolant fluid into the second coolant tank, a first coolant feeding conduit arranged in fluid communication between the first coolant tank and the second coolant tank, and a fluid pump arranged in the first coolant feeding conduit for controllable supply of coolant from the second coolant tank to the first coolant tank.

The wording "electric source" should be construed as a source generating electric power, or an electric power supply e.g. one or more batteries or battery modules. The electric source may preferably be a fuel cell or fuel cell system. Such fuel cell or fuel cell system comprises one or more fuel cell stacks arranged to generate electric power by a chemical process including hydrogen and oxygen. The electric source can either supply electric power directly to the electric traction motor, or via an energy storage.

Also, the wording "coolant circuit" should be understood as a coolant arrangement configured to deliver coolant to the electric source. The coolant circuit may, for example, comprise one or more coolant conduits.

An advantage of the present invention is that the use of a first and a second coolant tank can actively control the pressure levels such that different pressure levels on each side of a fuel cell membrane in the fuel cell system is more or less avoided. This is advantageously achieved by controlling the fluid pump arranged in the first coolant feeding conduit. Also, using two coolant tanks enable for positioning the first coolant tank at an elevated position relative to the second coolant tank. Hereby, coolant supplied to the coolant system is provided to the lower positioned second coolant tank, whereby the coolant can, by using the fluid pump, subsequently be provided to the first coolant tank. For a vehicle comprising a fuel cell system, it is advantageous to position the coolant tank at an elevated position so that it is arranged above e.g. a radiator of the fuel cell system.

In further detail, providing the fluid pump to the coolant system enables for pumping additional coolant into the first coolant tank, which during operation will increase the pressure in the system and the fluid pump can be used when certain safety conditions are fulfilled, for example when the vehicle is not operating, to fill up the coolant system from the lower, elevated position.

Furthermore, the electric source is preferably connected to an additional fluid pump. The second coolant tank can hereby advantageously be arranged to, from its lower position relative to the first coolant tank, ensure that the additional fluid tank receives a sufficient amount of coolant, preferably soaking the additional fluid pump in coolant.

According to an example embodiment, the coolant system may further comprise a second coolant feeding conduit arranged in fluid communication between the first coolant tank and the second coolant tank.

Hereby, coolant can be controlled to be supplied from the first coolant tank to the second coolant tank. This is advantageous when, for example, the amount of coolant in the second coolant tank falls below a predetermined minimum threshold level, and/or when the amount of coolant in the first coolant tank exceeds a predetermined maximum threshold level.

According to an example embodiment, the coolant system may further comprise a valve arranged in the second coolant feeding conduit, wherein the valve is controllable between a first state in which coolant fluid is supplied from the first coolant tank to the second coolant tank, and a second state in which coolant fluid in the first coolant tank is prevented from reaching second coolant tank. Hence, the valve controls the flow of coolant from the first coolant tank to the second coolant tank. The valve may be a pressure control valve, which is arranged to assume the first state when the pressure level in the second coolant feeding conduit exceeds a predetermined pressure threshold level, which pressure is increased in response to an increase amount of coolant in the first coolant tank. However, and advantageously, the valve may be connected to, and controlled by, a control unit as will be described further below.

Accordingly, and according to an example embodiment, the coolant system may further comprise a control unit connected to the fluid pump, the control unit comprising control circuitry configured to control operation of the fluid pump. Hereby, the fluid pump can be controlled during specific operating conditions, as will be described further below.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the control circuitry may be configured to receive a signal indicative of a pressure level in the coolant circuit, compare the pressure level with a predetermined pressure threshold level, and control the fluid pump to supply a flow of coolant from the second coolant tank to the first coolant tank when the pressure level is below the predetermined pressure threshold level.

The signal indicative of the pressure level may preferably be received from a pressure sensor arranged in the coolant system. The signal may also be received from a coolant level sensor, whereby the coolant level is determined. The coolant level in the first coolant tank should thus preferably be at such level as to be able to meet the desired pressure demands of the coolant circuit. An advantage is that the fluid pump can be controlled in to be in an active state to supply coolant from the second coolant tank to the first coolant tank when there is a desire to increase the pressure level in the coolant circuit. Hence, the fluid pump can move the necessary volume of coolant, as well as pressurize the coolant, from the second coolant tank to the first coolant tank to increase the pressure level in the coolant circuit. Also, and according to an example embodiment, the control unit may be connected to the valve, the control circuitry being configured to control the valve to assume the second state when the pressure level is below the predetermined pressure threshold level. Thus, also controlling the valve to be arranged in a closed position will advantageously assist in increasing the pressure level.

According to an example embodiment, the control circuitry may be further configured to control the valve to assume the first state when the pressure level is above the predetermined pressure threshold level. Hereby, the pressure level in the coolant circuit can be reduced when the pressure level is too high. Preferably, the fluid pump is here arranged in an inactive state, thereby not supplying coolant to the first coolant tank.

According to an example embodiment, the control unit may be further connected to the first and second coolant tanks, wherein the control circuitry is configured to receive a signal indicative of a coolant level present in the first coolant tank, receive a signal indicative of a coolant level present in the second coolant tank, determine a difference between the coolant level in the first coolant tank and the coolant level in the second coolant tank; compare the difference with a predetermined difference threshold limit; and control the fluid pump to supply a flow of coolant from the second coolant tank to the first coolant tank when the difference exceeds the predetermined difference threshold limit. An advantage is that the pressure levels in the first and second coolant tanks can be arranged at substantially equal pressure levels. Also, and according to an example embodiment, the control unit may be connected to the valve, the control circuitry being configured to control the valve to assume the second state when the difference exceeds the predetermined difference threshold limit.

According to an example embodiment, the control circuitry may be configured to receive a signal indicative of coolant filling of the second coolant tank at the filling portion, and control the fluid pump to supply a flow of coolant from the second coolant tank to the first coolant tank. Thus, when filling the second coolant tank, the pump can instantly deliver coolant from the second coolant tank to the first coolant tank.

According to an example embodiment, the coolant system may further comprise a deaeration conduit connected to the first coolant tank, the deaeration conduit being connectable to the coolant circuit for deaeration of the coolant circuit to the first coolant tank. According to an example embodiment, the coolant system may further comprise a pressure relief conduit arranged in fluid communication between the first coolant tank and the second coolant tank via a pressure relief device connected to the first coolant tank. Preferably, and according to an example embodiment, the pressure relief device may be a pressure relief valve. Hereby, when the pressure level in the first coolant tank exceeds a predetermined threshold limit, the pressure can be relieved in an automatic manner through the deaeration conduit. A further advantage is that the coolant is prevented from boiling.

According to an example embodiment, the coolant system may further comprise an electronically controlled valve arranged in the pressure relief conduit, the electronically controlled valve being connected to, and controlled by, the control unit. An advantage is that the valve can be controlled in an open position during filling, from the second coolant tank, of the first coolant tank, whereby air is allowed to return to the second coolant tank. The first coolant tank can hereby be filled-up more rapidly.

According to an example embodiment, the pressure relief device may be arranged on a vertically upper position of the first coolant tank, the pressure relief device is configured to relief the pressure in the first coolant tank when the pressure exceeds a predetermined tank pressure limit.

According to a second aspect, there is provided a vehicle comprising an electric traction motor and an electric source configured to supply electric power to the electric traction motor, the vehicle further comprises a coolant circuit connected to the electric source, and a coolant system according to any one of the embodiments described above in relation to the first aspect, wherein the coolant system is connected to the coolant circuit.

Effects and features of the second aspect are largely analogous to those described above in relation to the first aspect.

According to a third aspect, there is provided a method of controlling a coolant system of a vehicle, the coolant system being connected to a coolant circuit for an electric source arranged to supply electric power to an electric traction motor of the vehicle, wherein the coolant system comprises a first coolant tank configured to contain a coolant fluid, a second coolant tank comprising a filling portion for admitting coolant fluid into the second coolant tank, a first coolant feeding conduit arranged in fluid communication between the first coolant tank and the second coolant tank, and a fluid pump arranged in the first coolant feeding conduit for controllable supply of coolant from the second coolant tank to the first coolant tank, wherein the method comprises determining a pressure level in the coolant circuit, comparing the pressure level with a predetermined pressure threshold level; and controlling the fluid pump to supply a flow of coolant from the second coolant tank to the first coolant tank when the pressure level is below the predetermined pressure threshold level.

Effects and features of the third aspect are largely analogous to those described above in relation to the first aspect.

According to a fourth aspect, there is provided a computer readable medium carrying a computer program comprising program code means for performing the steps of the third aspect when the program means is run on a computer.

According to a fifth aspect, there is provided a computer program comprising program code means for performing the steps of the third aspect when the program is run on a computer.

Effects and features of the fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
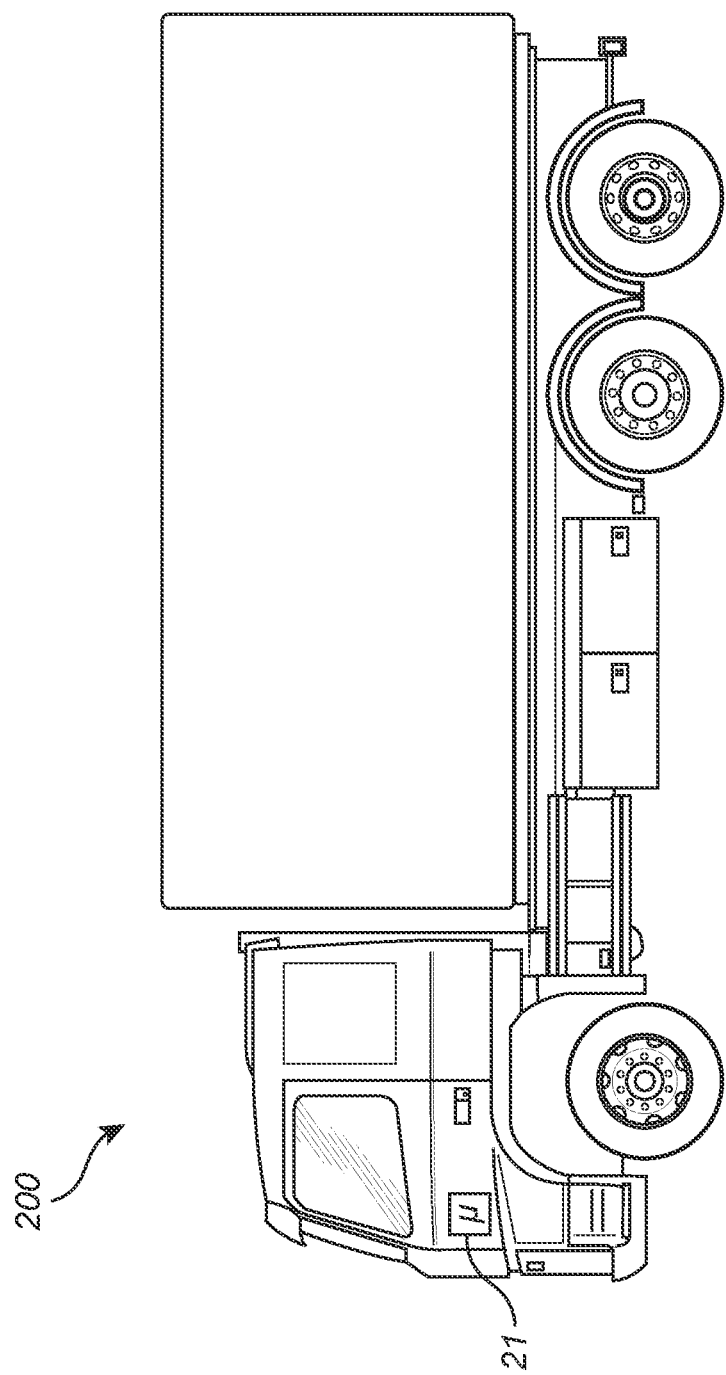
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 200 in the form of a truck. The vehicle comprises a traction motor (not shown) for propelling the wheels of the vehicle. The traction motor is in the example embodiment an electric machine arranged to receive electric power from an electric source (see FIGS. 2-4), such as a battery and/or a fuel cell system. As will be described below, the electric source is connected to a coolant system for supply of coolant to the electric source. The vehicle 200 also comprises a control unit 114 for controlling various operations, such as operation of the coolant system, as will also be described in further detail below.

Figure 2:
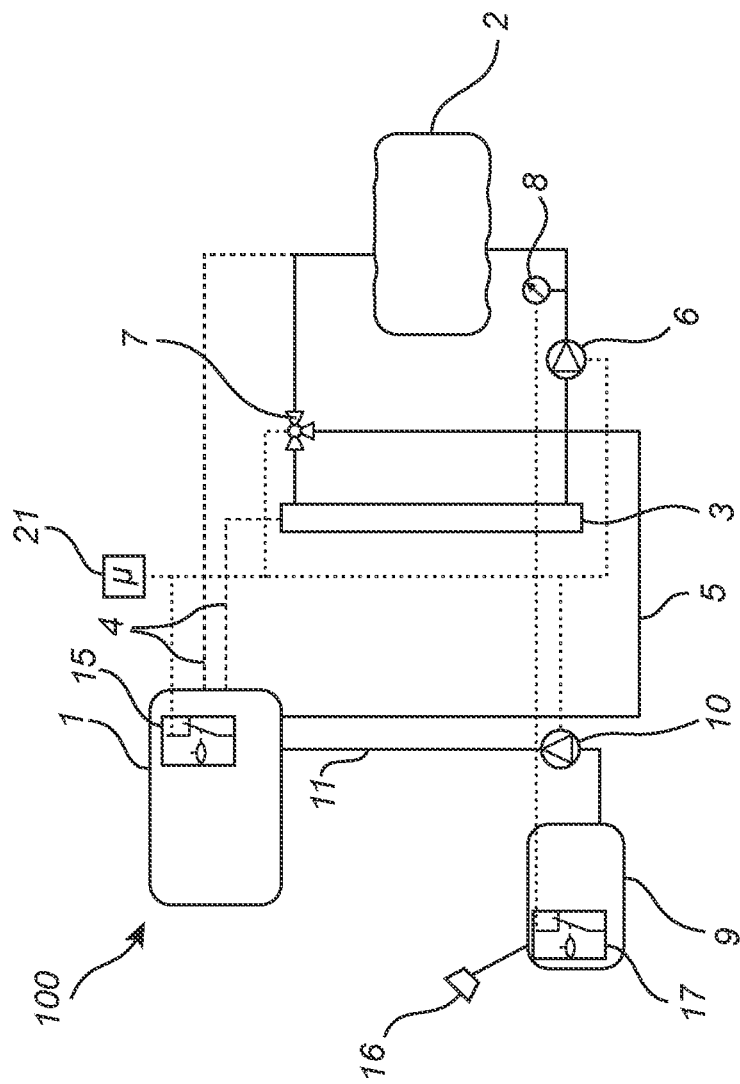
FIG. 2 is a schematic illustration of a coolant system according to an example embodiment.

In order to describe the coolant system in further detail, reference is made to FIG. 2 which is a schematic illustration of the coolant system 100 according to an example embodiment. As can be seen, the coolant system 100 comprises a first coolant tank 1 and a second coolant tank 9. The first coolant tank 1 comprises a first level sensor 15 arranged to detect a level of coolant present in the first coolant tank 1, and the second coolant tank 9 comprises a second level sensor 17 arranged to detect a level of coolant present in the second coolant tank 9. The first 1 and second 9 coolant tanks are separated from each other and hence arranged at a predetermined, non-zero distance from each other. The first 1 and second 9 coolant tanks are thus arranged to contain a coolant in the form of a coolant fluid. The first 1 and second 9 coolant tanks are fluidly connected to each other by means of a first coolant feeding conduit 11, in which coolant is allowed to flow from the second coolant tank 9 to the first coolant tank 1. Preferably, the first coolant tank 1 is arranged on the vehicle 200 at an elevated position in relation to the second coolant tank 9, and the coolant system 100 comprises a fluid pump 10 in the first coolant feeding conduit 11 and arranged to pressurize the coolant from the second coolant tank 9 and supply the pressurized coolant to the first coolant tank 1. Coolant fluid from an external coolant fluid supply source is thus received at a filling portion 16 of the second coolant tank 9. The filling portion 16 hereby serves as an interface to a user filling coolant into the second coolant tank 9.

As is further illustrated in FIG. 2, the coolant system 100 comprises a coolant supply conduit 5 connected to the first coolant tank 1. The coolant supply conduit 5 is in turn connected to a coolant circuit 30, thereby providing a fluid connection between the first coolant tank 1 and the coolant circuit 30. The coolant circuit 30 is fluidly connected to the above described electric source 2, in the following referred to as a fuel cell, providing coolant into the fuel cell 2 as well as receiving coolant expelled from the fuel cell 2. According to the example embodiment in FIG. 2, the coolant circuit 30 comprises a heat exchanger 3, an additional fluid pump 6, a pressure sensor 8, and a flow control valve 7.

Further, the coolant circuit 30 is in the FIG. 2 example connected to the first coolant tank 1 by means of two deaeration conduits 4. One of the deaeration conduits is connected to the flow control valve 7 and the other deaeration conduit is directly connected to the coolant circuit. The deaeration conduits 4 allows for supply of coolant from the coolant circuit 30 to the first coolant tank 1, which can advantageously control the temperature and/or pressure level of the fuel cell at desired levels. The system may comprise further deaeration conduits than what is depicted in the figures. For example, a deaeration conduit may be connected between the first coolant tank 1 and the fuel cell 2, etc.

The coolant system 200 further comprises a control unit 21. As exemplified, the control unit 21 is connected to the first level sensor 15 of the first coolant tank 1, the second level sensor 17 of the second coolant tank 9, the fluid pump 10, the additional pump 6, the pressure sensor 8, and the flow control valve 7. The control unit 21 comprises control circuitry arranged to either receives signals from the various devices and to control operation thereof. In particular, the control circuitry is configured to control operation of the fluid pump 10, the additional pump 6 and the flow control valve 7.

In particular, and according to an example embodiment, the control circuitry receives a signal from the pressure sensor 8 during operation of the vehicle 200. The signal is indicative of the pressure level in the coolant circuit 30. When the pressure level in the coolant circuit 30 is below a predetermined pressure threshold level, i.e. there is a desire to increase the pressure level in the coolant circuit 30, the control circuit controls the fluid pump 10 to start pressurize and supply coolant from the second coolant tank 9 to the first coolant tank 1. Hereby, the first coolant tank 1 is able to supply pressurized coolant into the coolant circuit 30 via the coolant supply conduit 5.

Furthermore, the control unit may determine if the coolant level in the first coolant tank is sufficient to meet the pressure demands from the coolant circuit, or sufficient to fulfill the coolant demands. If the coolant level is too low, i.e. not able to meet the coolant demands, the control unit can control the fluid pump 10 to supply coolant from the second coolant tank to the first coolant tank. The control unit may also monitor if there is a leakage in the system, and control the fluid pump to supply additional flow of coolant fluid from the second coolant tank to the first coolant tank if a leakage is detected.

Moreover, the control unit may also control the fluid pump to operate such that it is not running dry or if there is a need to top-up the system with coolant.

According to another operating scenario, the control circuitry is also configured to receive a signal from the first level sensor 15 and a signal from the second level sensor 17. The signal received from the first level sensor 15 indicates a coolant level currently present in the first coolant tank 1, while the signal received from the second level sensor 17 indicates a coolant level currently present in the second coolant tank 9. The control circuitry compares the coolant level in the first coolant tank 1 with the coolant level in the second coolant tank 9. When the difference is above a predetermined difference threshold limit, i.e. the coolant level in the first coolant tank 1 is lower compared to the coolant level in the second coolant tank 9, the control circuit controls the fluid pump 10 to supply a flow of coolant from the second coolant tank 9 to the first coolant tank 1. The control circuit is preferably configured to continuously determine the difference in coolant level between the coolant tanks and stop the fluid pump 10 from further operation when the coolant levels are substantially equal.

According to a still further example, the control circuit can also be configured to receive a signal indicating that the second coolant tank 9 is being filled up with coolant at the filling portion 9. The control circuit may determine that coolant is being filled up by means of a signal from the second level sensor 17 indicating an increase of coolant in the second coolant tank 9. The control circuit, when the second coolant tank 9 is filled, controls the fluid pump 10 to supply a flow of coolant from the second coolant tank to the first coolant tank.

Figure 3:
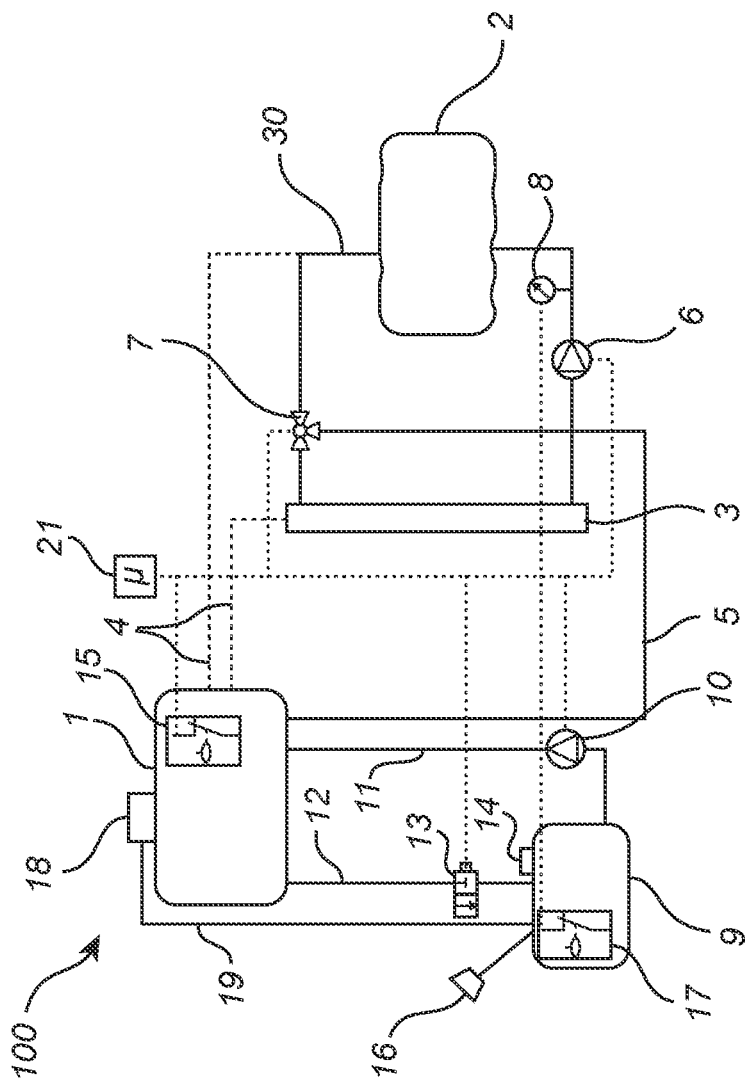
FIG. 3 is a schematic illustration of a coolant system according to another example embodiment.

In order to describe the coolant system 100 according to another example embodiment, reference is made to FIG. 3. Features of FIG. 3 also included in FIG. 2 will not be described in further detail but should be construed as also forming part of the FIG. 3 example embodiment.

As can be seen in FIG. 3, the coolant system 100 further comprises a second coolant feeding conduit 12. The second coolant feeding conduit 12 is arranged in fluid communication between the first coolant tank 1 and the second coolant tank 9, and allows coolant from the first coolant tank 1 to be supplied to the second coolant tank 9. A valve 13 is arranged in the second coolant feeding conduit 12, which valve 13 is connected to the control unit 21 for controlling operation thereof. When the valve 13 is operated by the control circuit as depicted in FIG. 3, the control circuit is configured to control the valve 13 to assume a first state, or position, in which coolant fluid is supplied from the first coolant tank 1 to the second coolant tank 9, and a second state, or position, in which coolant fluid in the first coolant tank 1 is prevented from reaching second coolant tank 9. In the second state/position, the valve 13 is thus closed.

Furthermore, the first coolant tank 1 comprises a pressure relief device 18, preferably a pressure relief valve connected at an upper surface of the first coolant tank 1. The pressure relief valve 18 is arranged to open when the pressure level in the first coolant tank 1 exceeds a certain pressure level, in order to safeguard that the pressure within the first coolant tank 1 is maintained at desired and safe levels. The pressure relief valve is thus a mechanical valve which opens at a predetermined pressure level. The gas expelled through the pressure relief valve 18 can be directed to the ambient environment or, as indicated in FIG. 3, be directed to the second coolant tank 9 via a pressure relief conduit 19 which is connected between the first 1 and second 9 coolant tanks.

The second coolant tank 9 also comprises a pressure relief device 14, which is preferably also a pressure relief valve 14 connected at an upper surface of the second coolant tank 9. functioning in a similar manner as the pressure relief valve 18 arranged on the first coolant tank 1.

By means of the example embodiment depicted in FIG. 3, the control circuitry is further configured to also control the valve 13 to assume the second state, i.e. to be arranged in the closed position, when there is a desire to increase the pressure level in the coolant circuit 30. On the other hand, when there is a desire to reduce the pressure in the coolant circuit 30, the control circuit controls the valve 13 to assume the first state, i.e. to be arranged in the open position.

Moreover, when the coolant level in the first coolant tank 1 is lower than the coolant level in the second coolant tank 9, the control circuit controls the valve to be closed when controlling the fluid pump 10 to supply coolant from the second coolant tank 9 to the first coolant tank 1.

Figure 4:
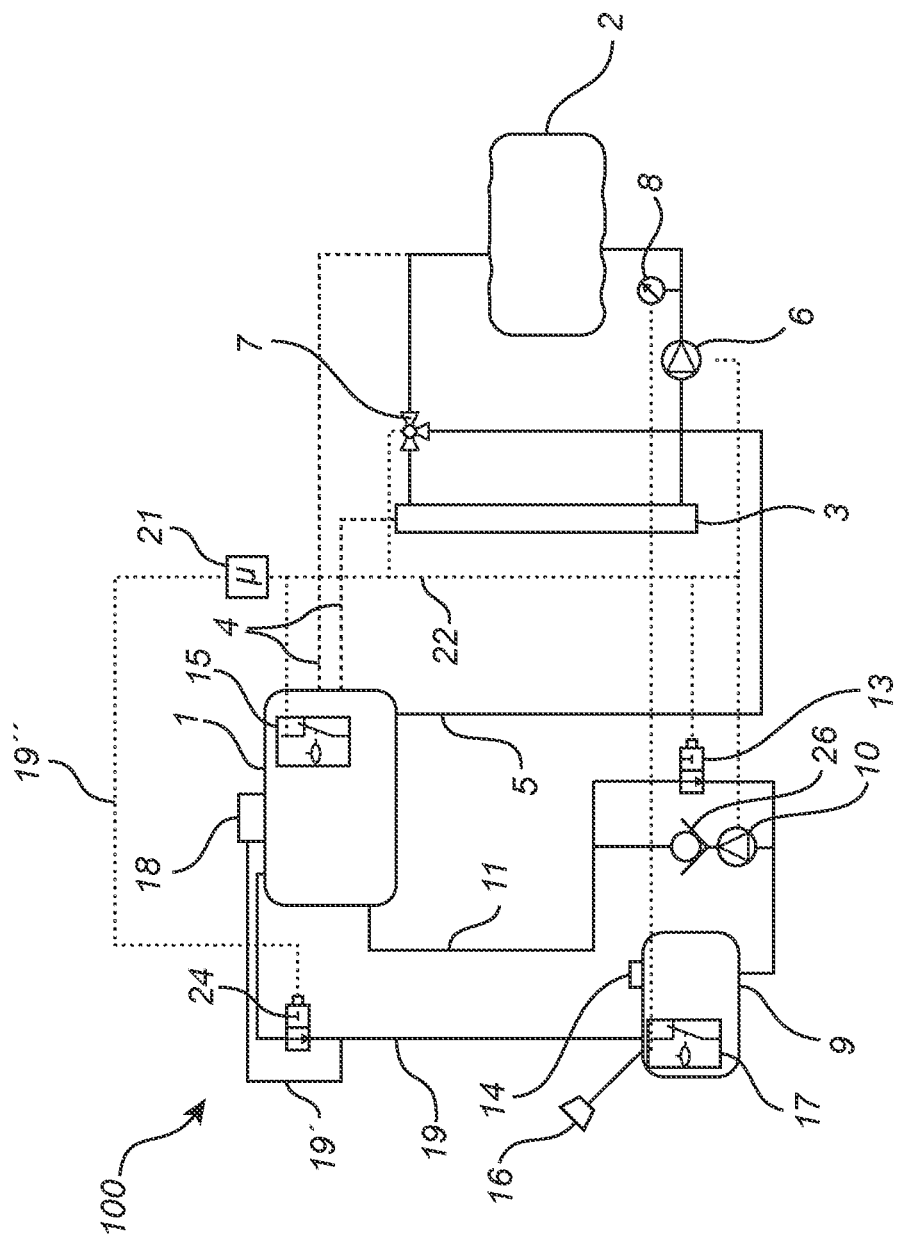
FIG. 4 is a schematic illustration of a coolant system according to a still further example embodiment.

Reference is now made to FIG. 4, which is a schematic illustration of a coolant system according to a still further example embodiment. Features of FIG. 4 also included in FIGS. 2 and 3 will not be described in further detail but should be construed as also forming part of the FIG. 4 example embodiment.

In addition to the features described above in relation to FIGS. 2 and 3, the example embodiment depicted in FIG. 4 also comprises a first relief conduit portion 19' and a second relief conduit portion 19". The first 19' and second 19" relief conduit portions form part of the above described relief conduit portion 19. The first relief conduit portion 19' is connected to the first coolant tank 1 and to an electronically controlled valve 24, while the second relief conduit portion 19" is connected to the pressure relief device 18. The electronically controlled valve 24 is also connected to the control unit 21, whereby the control circuit is configured to control operation of the electronically controlled valve 24. By means of the electronically controlled valve 24, the control circuitry is configured to arrange the electronically controlled valve 24 in an open position when filling the second coolant tank 9 at the filling portion 16 in order to allow air to be exhausted from the first coolant tank 1 which speeds up the filling process.

As can be seen in FIG. 4, the second coolant feeding conduit 12 forms part of the first coolant feeding conduit 11. In particular, the valve 13 is arranged in parallel with the fluid pump 10. A check valve 26 is also provided in the coolant feeding conduit and in parallel with the valve 13. By means of the arrangement in FIG. 4, when the pressure level of the pressurized coolant from the fluid pump 10 exceeds a threshold set by the check valve, the check valve will open and allow coolant to be supplied to the first coolant tank 1. On the other hand, when the fluid pump is not operating and the valve 13 is arranged in an open position, the check valve is closed, thereby guiding coolant from the first coolant tank 1 to the second coolant tank 9 via the open valve 13.

Figure 5:
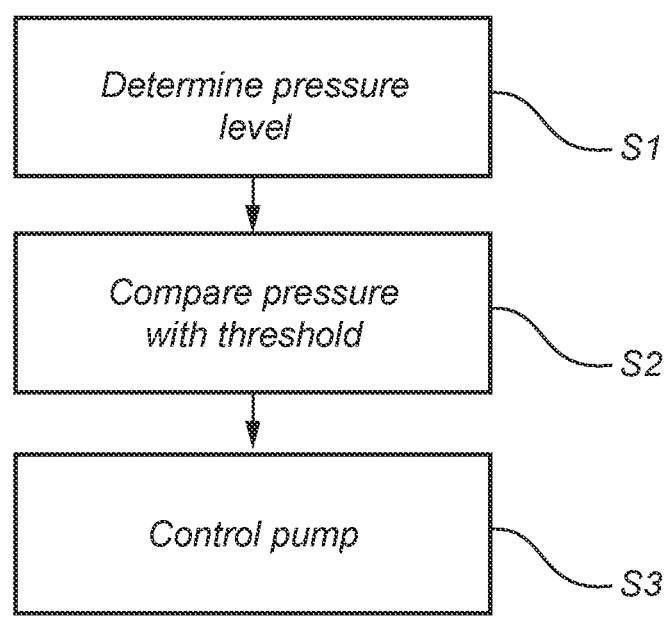
FIG. 5 is a flow chart of a method of controlling the coolant system in FIGS. 2-4 according to an example embodiment.

In order to sum up, reference is made to FIG. 5 which illustrates a flow chart of a method of controlling the coolant system described above in relation to FIGS. 2-4. During operation, the control circuitry determines S1 a pressure level in the coolant circuit 30. The pressure level is, by the control circuitry, compared S2 with a predetermined pressure threshold level. When the pressure level is below the predetermined pressure threshold level, the control circuitry controls S3 the fluid pump to supply a flow of coolant from the second coolant tank 9 to the first coolant tank 1.

On the other hand, when the pressure level is above the predetermined pressure threshold level, the control circuitry preferably controls the fluid pump 10 to be inactive. In addition, the control circuitry may control the valve to open to allow coolant to flow from the first coolant tank 1 to the second coolant tank 9.

As is evident from the above description in relation to FIGS. 2-4, the coolant system 100 is configured to be operated in a number of manners, and should hence not be limited to the example depicted in FIG. 5.

It is to be understood that the present disclosure is not limited to the embodiments described above and illustrated in the drawings; rather, the skilled person will recognize that many changes and modifications may be made within the scope of the appended claims.

The invention claimed is:

1. A coolant system for a vehicle at least partly propelled by an electric traction motor, the coolant system being configured to supply coolant to a coolant circuit for an electric source arranged to supply electric power to the electric traction motor, wherein the coolant system comprises
   a first coolant tank configured to contain a coolant fluid,
   a coolant supply conduit connected to the first coolant tank, the coolant supply conduit being connectable to the coolant circuit for supply of coolant from the first coolant tank to the coolant circuit,
   a second coolant tank comprising a filling portion for admitting coolant fluid into the second coolant tank,
   a first coolant feeding conduit arranged in fluid communication between the first coolant tank and the second coolant tank,
   a fluid pump arranged in the first coolant feeding conduit for controllable supply of coolant from the second coolant tank to the first coolant tank, and
   a control unit connected to the fluid pump, the control unit comprising control circuitry configured to control operation of the fluid pump, wherein the control circuitry is configured to:
   receive a signal indicative of a pressure level in the coolant circuit,
   compare the pressure level with a predetermined pressure threshold level, and
   control the fluid pump to supply a flow of coolant from the second coolant tank to the first coolant tank when the pressure level is below the predetermined pressure threshold level.

2. The coolant system according to claim 1, further comprising a second coolant feeding conduit arranged in fluid communication between the first coolant tank and the second coolant tank.

3. The coolant system according to claim 2, further comprising a valve arranged in the second coolant feeding conduit, wherein the valve is controllable between a first state in which coolant fluid is supplied from the first coolant tank to the second coolant tank, and a second state in which coolant fluid in the first coolant tank is prevented from reaching second coolant tank.

4. The coolant system according to claim 3, wherein the control unit is connected to the valve, the control circuitry being configured to:
   control the valve to assume the second state when the pressure level is below the predetermined pressure threshold level.

5. The coolant system according to claim 4, wherein the control circuitry is further configured to:
   control the valve to assume the first state when the pressure level is above the predetermined pressure threshold level.

6. The coolant system according to claim 1, wherein the control unit is further connected to the first and second coolant tanks, wherein the control circuitry is configured to:
   receive a signal indicative of a coolant level present in the first coolant tank,
   receive a signal indicative of a coolant level present in the second coolant tank,
   determine a difference between the coolant level in the first coolant tank and the coolant level in the second coolant tank;
   compare the difference with a predetermined difference threshold limit; and
   control the fluid pump to supply a flow of coolant from the second coolant tank to the first coolant tank when the difference exceeds the predetermined difference threshold limit.

7. The coolant system according to claim 3, wherein the control unit is connected to the valve, the control circuitry being configured to:
   control the valve to assume the second state when the difference exceeds the predetermined difference threshold limit.

8. The coolant system according to claim 1, wherein the control circuitry is configured to:
   receive a signal indicative of coolant filling of the second coolant tank at the filling portion, and
   control the fluid pump to supply a flow of coolant from the second coolant tank to the first coolant tank.

9. The coolant system according to claim 1, further comprising a pressure relief conduit arranged in fluid communication between the first coolant tank and the second coolant tank via a pressure relief device connected to the first coolant tank.

10. A vehicle comprising an electric traction motor and an electric source configured to supply electric power to the electric traction motor, the vehicle further comprises a coolant circuit connected to the electric source, and a coolant system according to claim 1, wherein the coolant system is connected to the coolant circuit.

11. A method of controlling a coolant system of a vehicle, the coolant system being connected to a coolant circuit for an electric source arranged to supply electric power to an electric traction motor of the vehicle, wherein the coolant system comprises a first coolant tank configured to contain a coolant fluid, a second coolant tank comprising a filling portion for admitting coolant fluid into the second coolant tank, a first coolant feeding conduit arranged in fluid communication between the first coolant tank and the second coolant tank, and a fluid pump arranged in the first coolant feeding conduit for controllable supply of coolant from the second coolant tank to the first coolant tank, wherein the method comprises:
   determining a pressure level in the coolant circuit,
   comparing the pressure level with a predetermined pressure threshold level; and controlling the fluid pump to supply a flow of coolant from the second coolant tank to the first coolant tank when the pressure level is below the predetermined pressure threshold level.

12. A computer readable medium carrying a computer program comprising program code means for performing the steps of claim 11 when the program means is run on a computer.

13. A computer program comprising program code means for performing the steps of claim 11 when the program is run on a computer.

* * * * *